(12) United States Patent
Arora et al.

(10) Patent No.: US 11,706,117 B1
(45) Date of Patent: Jul. 18, 2023

(54) MESSAGE-BASED MONITORING AND ACTION SYSTEM

(71) Applicant: Amazon Technologies, Inc., Seattle, WA (US)

(72) Inventors: Manpreet Arora, Seattle, WA (US); Aditya Vashist, Seattle, WA (US); Nivea Guru Mandavia, Steriling, VA (US); Bhavya Gupta, Delhi (IN); Fnu Himanshi, Bothell, WA (US); Rohit Kumra, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/458,864

(22) Filed: Aug. 27, 2021

(51) Int. Cl.
  *H04L 43/16* (2022.01)
  *H04L 43/0852* (2022.01)
  *H04L 43/0805* (2022.01)
  *H04L 43/0823* (2022.01)
  *H04L 67/55* (2022.01)

(52) U.S. Cl.
  CPC .......... *H04L 43/16* (2013.01); *H04L 43/0805* (2013.01); *H04L 43/0823* (2013.01); *H04L 43/0852* (2013.01); *H04L 67/55* (2022.05)

(58) Field of Classification Search
  None
  See application file for complete search history.

(56) References Cited

U.S. PATENT DOCUMENTS

| | | | | |
|---|---|---|---|---|
| 5,987,508 A | * | 11/1999 | Agraharam | H04L 61/30 709/217 |
| 6,735,772 B1 | * | 5/2004 | MacPhail | G06F 9/542 719/318 |
| 9,832,273 B2 | * | 11/2017 | Mencke | G06F 16/51 |
| 2002/0124081 A1 | * | 9/2002 | Primm | H04L 41/0893 709/224 |
| 2005/0234988 A1 | * | 10/2005 | Messick | H04L 67/564 |
| 2006/0004830 A1 | * | 1/2006 | Lora | G06F 11/0781 707/999.102 |
| 2009/0313333 A1 | * | 12/2009 | Fanebost | G06Q 10/107 709/206 |
| 2019/0317837 A1 | * | 10/2019 | Fletcher | G06F 11/3452 |
| 2021/0081840 A1 | * | 3/2021 | Darmour | G06Q 10/083 |
| 2022/0158988 A1 | * | 5/2022 | Zuzga | H04L 63/0807 |

* cited by examiner

*Primary Examiner* — James A Edwards
(74) *Attorney, Agent, or Firm* — Thomas | Horstemeyer, LLP (57) ABSTRACT

Disclosed are various embodiments for monitoring services in a multi-service system and detecting deviations in health metrics and/or business metrics of one or more of the services. In response to detecting a metric deviation for a given service, an enhanced message is generated detailing specific data associated with the detected deviation. The enhanced message is generated and transmitted to a recipient address associated with a services that may be affected by the deviation. An action service monitoring messages being received by a domain associated with the recipient address analyzes the information included in the message content. According to the analysis of the message, an action to be performed is identified according to the detected deviation and one or more action requests are generated and transmitted to one or more components and/or services of the multi-service system.

20 Claims, 8 Drawing Sheets

MESSAGE-BASED MONITORING AND ACTION SYSTEM

BACKGROUND

Services within a multi-service system may rely on a monitoring service to provide updates associated with the health and/or business of one or more different services within the multi-service system. In turn, some services may require a performance of one or more actions based at least in part on a particular deviation in a performance of a given service as detected by the monitoring service. To determine whether a deviation is present, a potentially affected service may continuously poll the monitoring service with regard to the status of the various services. However, this may not be scalable with traditional monitoring services that include notification limitations, throttling limitations, and/or other types of limitations that may be in place for a given system.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to a push-based message monitoring and action system. In particular, the present disclosure relates to monitoring multiple services performing different types of tasks in a multi-service system and detecting deviations in health metrics (e.g., latency, outages, errors, saturation, load or demand issues, etc.) and/or business metrics (e.g., business performance, customer interactions, approvals/rejections, etc.) of one or more services in the multi-service system that may interfere with a performance of other services or components of the multi-service system. In response to detecting a deviation in a health and/or business metric of a given service, the monitoring service generates an enhanced message detailing specific data associated with the detected deviation. According to configuration data associated with the given service, the enhanced message is generated and transmitted to a recipient address or group of recipient addresses associated with a service that may be affected by the deviation. An action service monitoring messages being received by a domain associated with the recipient address(es) analyzes the information associated with the detected deviation that is included in the message content. According to the analysis of the message, the action service identifies an action to be performed according to the detected deviation and generates one or more action requests to be performed by one or more components of the multi-service system or other services affected by the detected deviation.

According to various examples, a monitoring service of the present disclosure analyzes health and/or business metric data associated with one or more services by comparing the obtained metric values with predefined thresholds. When a given metric value fails to meet or exceed an expected and/or predefined threshold, a monitoring service generates a push-based message including the detected deviation and any additional data that is defined in a configuration file for the associated service. The configuration file further defines the recipient addresses for the recipients to receive the message. The ability to provide a push-based message to specific domains identified in the configuration file(s) used by the monitoring service to generate the message is beneficial in overcoming and/or bypassing the limitations that may be associated with a traditional monitoring service.

In various examples, the action service of the present disclosure monitors a message database that includes messages received by one or more recipient domains. Upon identifying a message that is received for a given domain, the action service analyzes the message content to identify a detected metric deviation and determines if there are any actions to be performed based on the identified deviation. In various examples, an action includes updating a database, executing code to perform a compute action associated with the detected issue, executing code to modify a user interface, executing a query action, updating a configuration action, notifying one or more other entities of the detected issue, and/or other actions.

For example, in a payment platform system, the message may indicate that a particular payment issuer service is experiencing an outage. In this instance, an action may include executing code to modify a user interface associated with the payment platform to remove reference to the particular issuer service. As such, users interacting with the user interface will be unable to select transaction accounts associated with the issuer service experiencing the outage for payment of a given item. According to various examples, the timeframe for performing an action may be reduced by the automated features of the present disclosure. For example, the time to respond to a particular issue is reduced by configuring the action service to review the message content in the received email messages and initiate the performance of one or more actions based on the content of the generated emails.

Figure 1A:
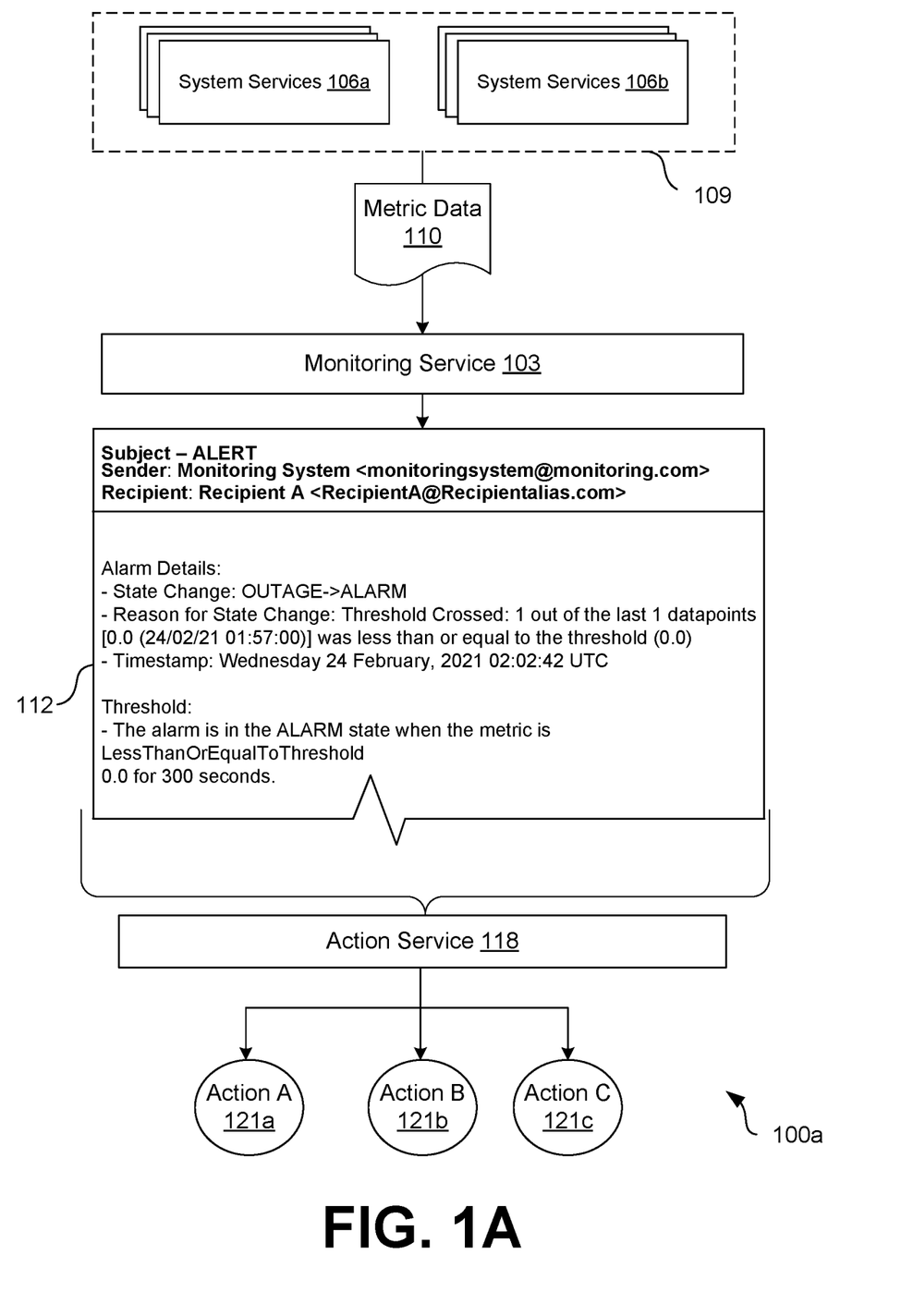
FIGS. 1A and 1B are drawings of example workflow scenarios involving the generating of messages indicating an issue with a given service and analyzing the messages to determine actions to perform in view of the issue according to various embodiments of the present disclosure.
Figure 1B:
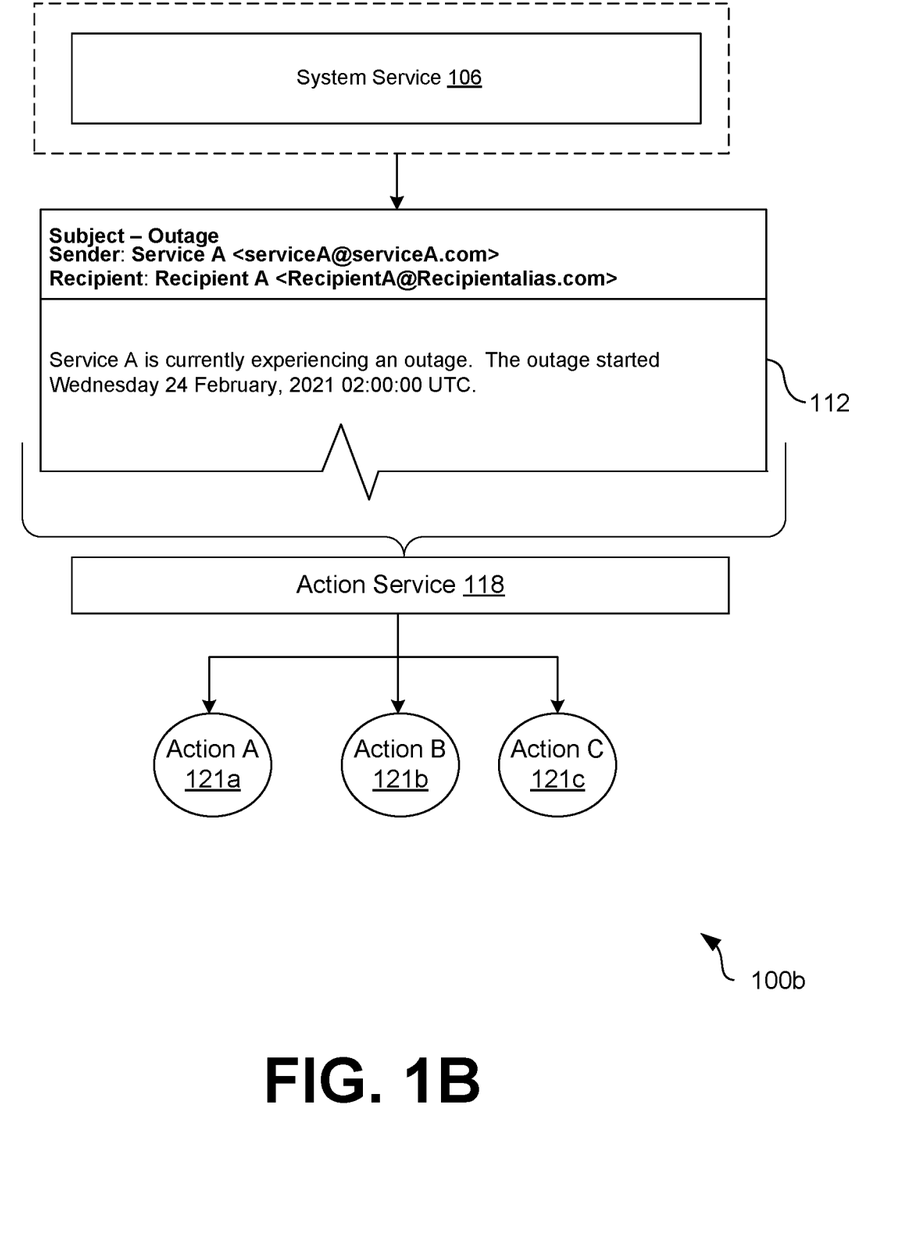

Turning now to FIGS. 1A and 1B, shown are example workflow scenarios 100 (e.g., 100a, 100b) associated with the workflow of the monitoring and action system of the present disclosure. In particular, FIG. 1A illustrates and example scenario 100a where a monitoring service 103 detects an issue with a system service 106 of a multi-service system 109. In various examples, a multi-service system 109 can include native services 106a as well as third-party services 106b implemented by third-party service providers.

According to various examples, a system service 106 relates to a networked application that can obtain or otherwise act upon an internal or external request or trigger, process the request, and generate a response to the request. System services 106 may be dependent upon other services in a computing system and may communicate with the other services over a network. For example, a service may retrieve and/or store data in another service and/or make service calls/requests to other services. One or more system services 106 can be provided by the same provider or by different providers. According to various examples, the system services 106 perform different types of tasks and can be integrated with one another to form the multi-service system 109. For example, a payment processing system may include services 106 associated with issuers, services 106 associated with an electronic commerce system offering the sale of goods or services, services 106 associated with a transaction terminal, and/or other types of system services 106 as can be appreciated.

According to various examples, the system services 106 being monitored by the monitoring service 103 generate metric data 110 and provide the metric data 110 to the monitoring service 103. The metric data 110 comprises health metrics (e.g., latency, outages, errors, saturation, load, or demand issues, etc.) and/or business metrics (e.g., business performance, customer interactions, approvals/rejections, etc.) associated with a respective system service 106. In some examples, the system services 106 provide the metric data 110 to the monitoring service 103 in response to a request from the monitoring service 103. In other examples, the system services 106 provide the metric data 110 to the monitoring service 103 without a request by the monitoring service 103. For example, a system service 106 may be configured to provide the metric data 110 to the monitoring service 103 randomly, periodically, or based on a predefined schedule.

In one or more examples, the monitoring service 103 consumes the metric data 110 from the different system services 106 and triggers an alarm when a threshold is breached. For example, the monitoring service 103 compares the metric values of metrics included in the metric data 110 with predefined thresholds associated with a given system service 106. If a metric value for a given metric fails to meet or exceed a predefined threshold, the monitoring service 103 triggers an alarm based on the threshold not being met.

In various examples, the monitoring service 103 triggers an alarm by generating a message 112 according to configuration data associated with the corresponding system service 106. In one or more examples, the message 112 comprises an email that is generated to include content identifying the metric deviation and other data defined by the configuration data. For example, the message 112 can comprise an identification of the metric deviation (e.g., outage, latency issue, etc.) the expected metric value, the actual metric value, a time in which the deviation was detected, a timeline for how long the deviation has occurred, one or more predefined keywords or status descriptions that can be used to trigger a given action, and/or other information.

In various examples, the recipient address(es) for the recipient(s) of the message 112 is defined by the configuration data. In some examples, the recipient address(es) defined in the configuration data corresponds to individual addresses. In other examples, the recipient address(es) corresponds to a group address. The recipient(s) of the given message may differ based on the type of detected deviation. For example, if the deviation corresponds to an outage associated with Service A, then the recipient may correspond to Recipient A. However, if the detected deviation corresponds to a latency issue, the recipient may correspond to Recipient B. In some examples, some recipient domains may be configured to restrict messages received from various entities, including the monitoring service 103. To bypass this limitation, the monitoring service 103 may send the message 112 to an alias domain associated with the recipient.

Upon generating the message 112, the monitoring service 103 transmits the message 112 to the recipient. Although not illustrated in FIG. 1A, in various examples, a messaging service 115 (FIG. 2) identifies the various messages 112 that are received in association with one or more domains and/or domain aliases. Upon detecting a receipt of a message 112 by a given domain or domain alias, the messaging service 115 intercepts the message 112. In some examples, the messaging service 115 stores the message 112 in a message database or other type of data store. In some examples, the messaging service 115 copies the message 112 and stores the copy of the message 112 in the message database.

In some examples, the messaging service 115 generates and/or modifies a log that identifies the message 112. In one or more examples, the log is stored in the message database for access by the action service 118. In some examples, the messaging service 115 performs another type of action that triggers the action service 118 to identify the message. For example, the messaging service 115 may notify the action service 118 of the message 112. In this example, the messaging service 115 may provide a copy of the message 112 and/or message content to the action service 118 in response to intercepting the message 112.

In various examples, an action service 118 identifies one or more messages 112 that are received by a given a domain and/or alias and performs an analysis on the message 112 to determine what actions 121 (e.g., 121a, 121b, 121c) may be required. In one or more examples, the action service 118 polls the message database to identify messages 112 corresponding to a specific domain and/or domain alias. In various examples, in response to identifying a message 112 associated with a specific domain and/or domain alias, the action service 118 parses the message content (e.g., subject, body, header, etc.) to identify one or more terms. The one or more terms in the message content may be compared with a list of keywords corresponding to the given domain, domain alias, and/or system service 106 associated with the detected deviation.

In response to comparing the message content with the list of keywords, the action service 118 identifies one or more actions 121 that need to be performed in response to the detected deviation. Upon identifying the one or more actions 121, the action service 118 generates action requests requesting a performance of the one or actions and transmits the action requests to the one or more system services 106 and/or components that are configured to perform the given actions 121.

In various examples, an action 121 comprises updating a database, executing code or performing a compute action that is based on the detected deviation, executing code to modify a user interface, running a query action, updating a configuration action, notifying other parties and/or endpoints of the detected issue and/or other types of action that may need to be performed in response to a detected deviation. For example, if a particular system service 106 is detected to be subject to an outage, an action 121 may occur which limits access to and/or use associated with the given service 106.

In the example of a payments system, an outage may be detected with respect to a given payment issuer service 106. In response to identifying the outage upon an analysis of the received message 112, an action service 118 generates and transmits one or more action requests to various services 106 and/or system components with requests to perform various actions 121. One of the services 106 may correspond to a payment intake service, and the payment intake service may modify user interface code for a user interface configured to intake payment information. The modification may correspond to including an indication in the user interface that the payment intake service is unable to accept payment associated with the payment issuer service that is experiencing the outage.

Turning now to FIG. 1B, shown is an example workflow scenario 100b associated with the monitoring and actin system of the present disclosure. The workflow scenario 100b of FIG. 1B differs from the workflow scenario 100a of FIG. 1A in that the message 112 analyzed by the action service 118 is sent by the system service 106 and not the monitoring service 103. In various examples, a system service 106 may be configured to generate and send a message 112 to a given recipient in response to a planned and/or current deviation for a given metric. For example, if a system service 106 is experiencing an outage and/or is aware of a planned outage at a later time, the system service 106 generates a message 112 notifying the recipient system service 106 of the outage.

Similarly to FIG. 1A, in various examples, a messaging service 115 intercepts the message 112 being sent by the system service 106 to a given recipient and stores the message 112 or a copy of the message 112 in a messaging database. In various examples, an action service 118 identifies one or more messages 112 that are received by a given domain and/or alias and performs an analysis on the message 112 to determine what actions 121 (e.g., 121a, 121b, 121c) may be required. In one or more examples, the action service 118 polls the message database to identify messages 112 corresponding to a specific domain and/or domain alias. In various examples, in response to identifying a message 112, the action service 118 parses the message content to identify one or more terms in the message content. The one or more terms in the message content may be compared with a list of keywords corresponding to the given domain, domain alias, and/or system service 106 associated with the detected deviation.

In response to comparing the message content with the list of keywords, the action service 118 may identify one or more actions 121 that need to be performed in response to the detected deviation. Upon identifying the one or more actions 121, the action service 118 generates action requests requesting a performance of the one or actions and transmits the action requests to the one or more system services 106 and/or components that are configured to perform the given actions 121. In the following discussion, a general description of the system and its components is provided, followed by a discussion of the operation of the same.

Figure 2:
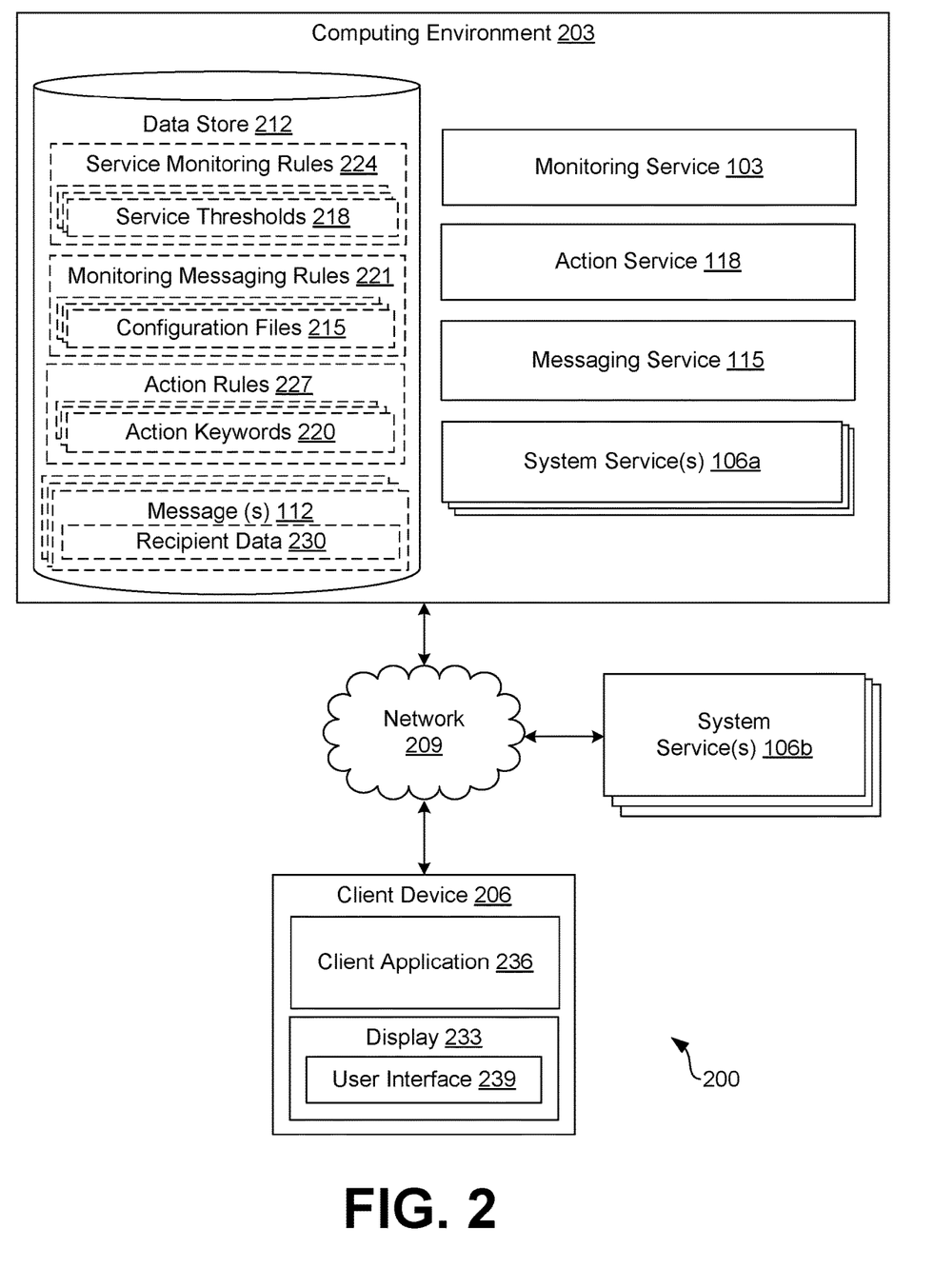
FIG. 2 is a schematic block diagram of a networked environment according to various embodiments of the present disclosure.

With reference to FIG. 2, shown is a networked environment 200 according to various embodiments. The networked environment 200 includes a computing environment 203, a client device 206, and third-party system services 106b, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a monitoring service 103, an action service 118, a messaging service 115, system services 106a, and other applications, services, processes, systems, engines, or functionality not discussed in detail herein. The monitoring service 103 is executed to monitor the health and business metrics of the various services 106 (e.g., 106a, 106b) making up a computing system (e.g., payment platform system). In various examples, the monitoring service 103 requests health metrics (e.g., latency, outages, errors, saturation, load or demand issues, etc.) and/or business metrics (e.g., business performance, customer interactions, approvals/rejections (e.g., customer's keep getting denied for particular request), etc.) from the one or more services 106. In one or more examples, the monitoring service 103 requests the metric data 110 using an application programming interface (API) call associated with the one or more services 106. In other examples, the one or more services 106 provide the monitoring service 103 with the metrics without a request from the monitoring service 103.

In various examples, the monitoring service 103 analyzes the metrics data 110 received from a given service 106 to determine whether there is a deviation from what is expected for a given metric. In one or more examples, the monitoring service 103 compares the metric values for the metrics included in the metric data 110 with predefined service thresholds 218 for a given service 106. If the monitoring service 103 detects a deviation for a particular metric, the monitoring service 103 triggers an alarm according to the monitoring messaging rules 221 and the corresponding configuration file 215.

In various examples, the monitoring service 103 triggers an alarm by generating a message 112 according to the configuration file 215 associated with the corresponding system service 106. In one or more examples, the message 112 comprises an email that is generated to include content identifying the metric deviation and other data defined by the configuration data. For example, the message 112 may comprise at least one of an identification of the metric deviation (e.g., outage, latency issue, etc.) the expected metric value, the actual metric value, a time in which the deviation was detected, a timeline for how long the deviation has occurred, one or more predefined keywords or status descriptions that can be used to trigger a given action, and/or other information. In various examples, the recipient address(es) for the recipient(s) of the message 112 is defined by the configuration file 215. Upon generating the message 112, the monitoring service 103 transmits the message 112 to the recipient.

The action service 118 is executed to analyze messages 112 to identify actions 121 that need to be performed. In one or more examples, the action service 118 identifies messages 112 that are received by recipient addresses associated with a given a domain and/or alias and performs an analysis on the message 112 to determine what actions 121 may be required. For example, the action service 118 polls the message database to identify messages 112 corresponding to a specific domain and/or domain alias. In various examples, in response to identifying a message 112 associated with a specific domain and/or domain alias, the action service 118 parses the message content to identify one or more terms. The one or more terms in the message content may be compared with a list of action keywords 220 corresponding to the given domain, domain alias, and/or system service 106 associated with the detected deviation.

In response to comparing the message content with the list of keywords 220, the action service 118 may identify one or more actions 121 that need to be performed in response to the detected deviation. Upon identifying the one or more actions 121, the action service 118 generates action requests requesting a performance of the one or actions and transmits the action requests to the one or more system services 106 and/or components that are configured to perform the given actions 121.

The messaging service 115 is executed to monitor messages directed towards recipients associated with a given domain (s) and/or domain alias(es). In various examples, the messaging service 115 acts as an intermediary between an email server and a recipient device. The messaging service 115 can accept and/or reject messages 114 based at least in part on the email address, an internet protocol address, or domain of a given sender. In various example, the messaging service 115 identifies messages 112 that are directed towards recipient addresses of a given domain or domain alias. In response to identifying a message directed towards a given domain, the messaging service 115 stores the message 112 and/or a copy of the message 112 in a messaging database or other type of data store for access by the action service 118.

In various examples, a system service 106 includes native services 106a, third-party services 106b implemented by third-party service providers and/or a combination of native services 106 and third-party services 106b. According to various examples, a system service 106 relates to a networked application that can obtain or otherwise act upon an internal or external request or trigger, process the request, and generate a response to the request. System services 106 may be dependent upon other services in a computing system (e.g., multi-service system) and may communicate with the other services over a network 209. For example, a service 106 may retrieve and/or store data in another service 106 and/or make service calls/requests to other services 106. One or more system services 106 can be provided by the same provider or by different providers. According to various examples, the system services 106 perform different types of tasks and can be integrated with one another to form the multi-service system 109.

The data stored in the data store 212 includes, for example, service monitoring rules 224, monitoring messaging rules 221, action rules 227, messages 112, and potentially other data. The service monitoring rules 224 include rules, models, and/or configuration data for the various algorithms or approaches employed by the monitoring service 103 to monitor the various services 106. In various examples, the service monitoring rules 224 include service thresholds 218 used by the monitoring service 103 to identify a deviation in a metric value of a metric from what is expected.

The monitoring messaging rules 221 include rules, models, and/or configuration data for the various algorithms or approaches employed by the monitoring service 103 to generate messages 112 that will be analyzed by the action service 118. In various examples, the monitoring messaging rules 221 include configuration files 215 used by the monitoring service 103 to generate a message 112. In various examples, a configuration file 215 corresponds to a given monitored service 106. In some examples, there may be multiple configuration files 215 associated with a given monitored service 106. For example, the monitoring service 103 may select a configuration file 215 from a plurality of configuration files 215 associated with the system service 106 based at least in part on a type of deviation detected.

According to various examples, a configuration file 215 defines the content to include in a dynamically generated message. For example, the message 112 can comprise an identification of the metric deviation (e.g., outage, latency issue, etc.) the expected metric value, the actual metric value, a time in which the deviation was detected, a timeline for how long the deviation has occurred, one or more predefined keywords or status descriptions that can be used to trigger a given action, and/or other information defined by the configuration file 215. In some examples, a configuration file may include a message template that is used to generate a given message. In some examples, the message templates differ based at least in part on the type of detected deviation. In various examples, the recipient address(es) for the recipient(s) of the message 112 is defined by the configuration data. The recipient(s) of the given message may differ based on the type of detected deviation. In addition, the configuration file 215 may define multiple recipients for the generated message 112.

The action rules 227 include rules, models, and/or configuration data for the various algorithms or approaches employed by the action service 118 to analyze messages 112 and identify actions 121 to be performed. In various examples, the action rules 227 include action keywords 220 that are mapped or otherwise associated with various actions 121 that can be performed. In one or more examples, the action service 118 parses the message content of a message in accordance of the action rules 227 and compares the terms in the parsed content with the action keywords 220. When one or more terms matches one or more action keywords 220, the action service 118 determines what actions 121 are required based at least in part on the matching action keywords 220. For example, if the message 112 includes a term "outage" which matches with one of the action keywords 220, the action service 118 determines the required actions 121 according to the actions 121 mapped to the action keyword 220 for "outage." In some examples, the defined actions 121 further define the recipient associated with the action request.

The messages 112 correspond to messages 112 being directed to a given domain and/or domain alias and intercepted by the messaging service 115 for analysis by the action service 118. In various examples, a message 112 comprises a push-based notification email. However, the message 112 is not limited to an email and can comprise a push notification, a short message service (SMS) message, and/or other type of notification. In various examples, the messages 112 comprise recipient data 230, message content, sender data, and/or other data. The recipient data 230 includes a recipient address, a recipient domain, and/or other recipient data as can be appreciated. In some examples, a particular domain of an entity may not support receiving messages 112 from the monitoring service 103 and/or other service 106. However, the monitoring service 103 and/or the other service 106 may generate a message 112 where the recipient data 230 includes an alias address and/or domain. As such, the message 112 can be intercepted by the messaging service 115 and stored in the messaging database for analysis by the action service 118.

The client device 206 is representative of a plurality of client devices that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 206 may include a display 233. The display 233 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as a client application 236 and/or other applications. The client application 236 may be executed in a client device 206, for example, to access network content served up by the computing environment 203 and/or other servers, thereby rendering a user interface 239 on the display 233. For example, a user may interact with the client application 236 to define the configuration files 215 for generating the messages 112 and to define the actions 121 to be performed by the action service 218 in response to receiving a message 112 that includes certain action keywords 220. To this end, the client application 236 may comprise, for example, a browser, a dedicated application, etc., and the user interface 239 may comprise a network page, an application screen, etc. The client device 206 may be configured to execute applications beyond the client application 236 such as, for example, email applications, social networking applications, word processors, spreadsheets, and/or other applications.

Figure 3:
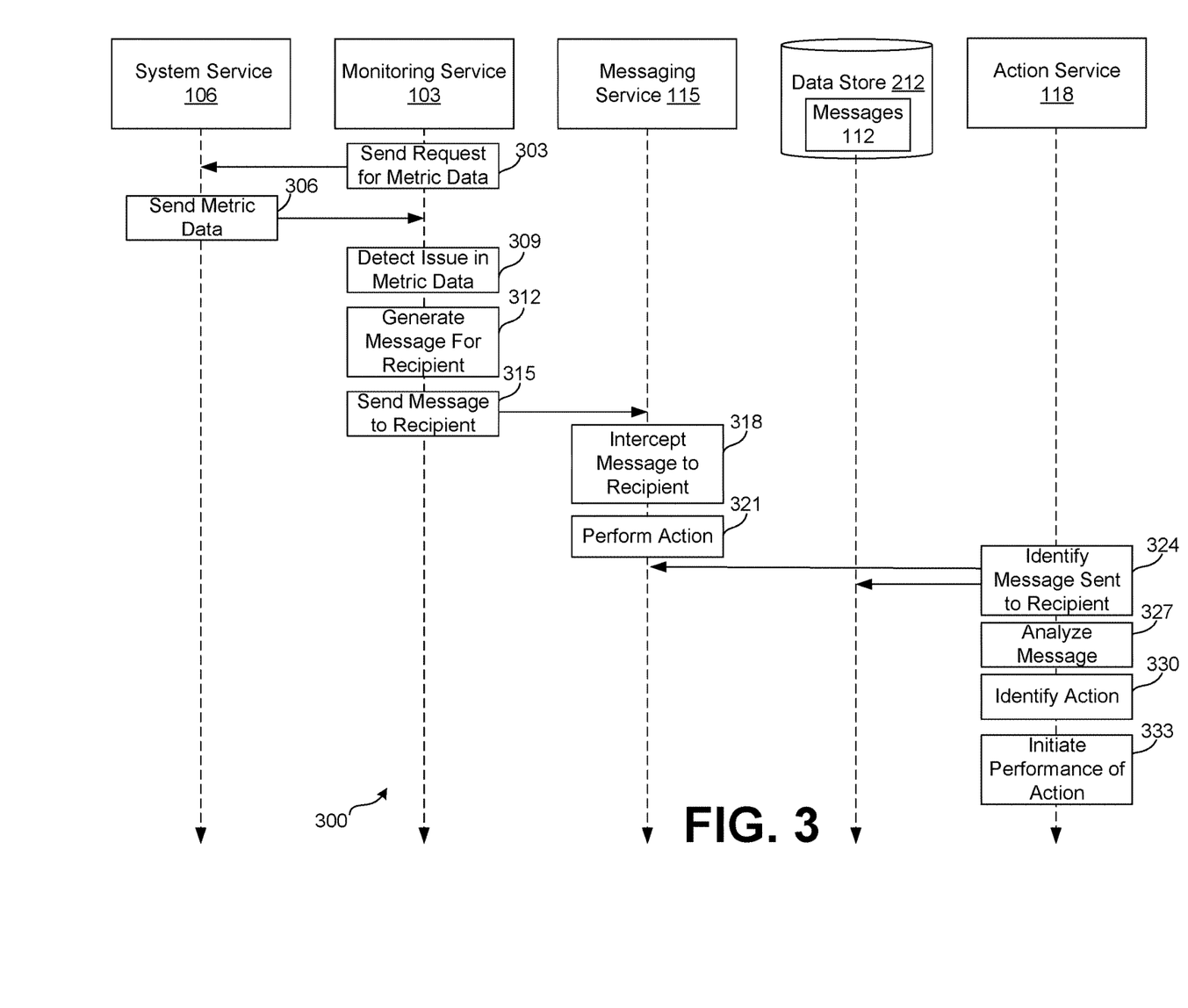
FIGS. 3 and 4 are sequence diagrams illustrating functionality implemented by components of the networked environment of FIG. 2 according to various embodiments of the present disclosure.

Next, a general description of the operation of the various components of the networked environment 200 is provided with reference to FIGS. 3-6. To begin, FIG. 3 illustrates a sequence diagram 300 illustrating functionality implemented by components of the networked environment 200. It is understood that the sequence diagram of FIG. 3 provides merely an example of the many different types of functional arrangements that can be employed to implement the portions of the networked environment 200 as described herein. As an alternative, the sequence diagram of FIG. 3 can be viewed as depicting an example of elements of a method implemented within the networked environment 200 in some implementations. According to various examples, FIG. 3 relates to the functionality implemented by components of the networked environment 200 with respect to the example scenario 100a of FIG. 1A where a monitoring service 103 detects an issue with a system service 106 of a multi-service system 109 and the action service 118 analyzes the message 112 generated by the monitoring service 103 to determine actions to be performed.

To begin, at box 303, the monitoring service 103 sends a request for metric data 110 to a system service 106. In some examples, the monitoring service 103 sends the request for metric data 110 to the system service 106 via an API call associated with the system service 106. In some examples, the request is for a particular metric. In other examples, the requests is for a collection of metric data 110 corresponding to multiple metrics associated with the system service 106.

At box 306, the system service 106 responds to the request for metric data 110 and provides the requested metric data 110 to the monitoring service 103. In various examples, the metric data 110 comprises values for one or more health metrics (e.g., latency, outages, errors, saturation, load or demand issues, etc.) and/or one or more business metrics (e.g., business performance, customer interactions, approvals/rejections, etc.).

At box 309, the monitoring service 103 detects an issue with the service 106 based at least in part on an analysis of the metric data 110. For example, the monitoring service 103 compares the value(s) of one or more metrics included in the metric data 110 with predefined service thresholds 218 associated with the system service 106. If a metric value for a given metric fails to meet or exceed the corresponding service threshold 218, the monitoring service 103 determines that there is an issue (e.g., deviation) associated with the given metric.

At box 312, the monitoring service 103 generates a message 112 according to the configuration file 215 associated with the corresponding system service 106. The configuration file 215 defines the content to include in a dynamically generated message 112. For example, the message 112 can comprise an identification of the metric deviation (e.g., outage, latency issue, etc.) the expected metric value, the actual metric value, a timestamp for the time and date associated with when the deviation was detected, a timeline for how long the deviation has occurred (e.g., number of minutes, number of hours, number of days, etc.), one or more predefined keywords or status descriptions that can be used to trigger a given action, and/or other information defined by the configuration file 215. In various examples, the recipient address(es) for the recipient(s) of the message 112 is defined by the configuration file 215.

At box 315, the monitoring service 103 sends the message 112 to the recipient address associated with the message 112 and defined by the configuration file 215. In various examples, the message 112 is sent as a push-based notification to the recipient address. As can be appreciated, the message 112 is transferred from the monitoring service 103 to an email server which in turn routes the message 112 to the appropriate recipient address based at least in part on the domain associated with the message 112.

At box 318, the messaging service 115 intercepts the message 112 being routed from the email server to the recipient. For example, the messaging service 115 monitors the incoming messages 112 for one or more domains and if a message 112 is detected that is associated with the one or more domains, the message 112 is intercepted by the messaging service 115.

At box 321, the messaging service 115 performs an action in response to intercepting the message 112. In some examples, the messaging service 115 stores the message 112 in a messaging database or other data store 212. In some examples, the messaging service 115 copies the message 112 and stores the copy of the message 112 in the messaging database and allows the original message to be transmitted to the recipient. In other examples, the messaging service 115 stores the message 112 in the messaging database. In some examples, the messaging service 115 generates and/or modifies a messaging log that is stored in the data store 212. In various examples, the message log is generated and/or modified to include the messaging content and recipient data associated with the intercepted message 112. In some examples, the messaging service 112 maintains the message log associated with the identified messages 112.

At box 324, the action service 118 identifies a message 112 sent to a given recipient and/or domain. In one or more examples, the action service 118 polls the messaging database and/or messaging service 112 for messages 112 corresponding to a particular recipient and/or domain. The action service 118 may poll the messaging database and/or messaging service 112 periodically, randomly, or at a predefined schedule. When a message 112 corresponding to the domain and/or recipient is detected in the messaging database or by the messaging service 112, the action service 118 identifies the message 112 and obtains the message 112, copy of the message 112, or message log from the messaging database or messaging service 112.

At box 327, the action service 118 analyzes the message 112. In one or more examples, the action service 118 parses the message content in view of the action rules 227 to identify terms and/or phrases in the message content that can be used to identify the detected issue and determine the appropriate actions required in response to the detected issue.

At box 330, the action service 118 identifies an action 121 that is to be performed based at least in part on the detected issue. For example, the action service 118 compares the detected terms and/or phrases with the action keywords 220 associated with the detected issue and the service 106 experiencing the issue. In one or more examples, the action keywords 220 are mapped to different actions 121 that are to be performed. If there is a match between a term and one or more of the action keywords 220, the identified action 121 is the action 121 associated with the matching action keywords 220.

At box 333, the action service 118 initiates the performance of the identified action 121. For example, the action service 118 may send an action request to one or more components of the multi-service system 109 and/or services 106 included in the multi-service system 109 identifying the action 121 that needs to be performed based at least in part on the identified action 121. Thereafter, this portion of the process proceeds to completion.

Figure 4:
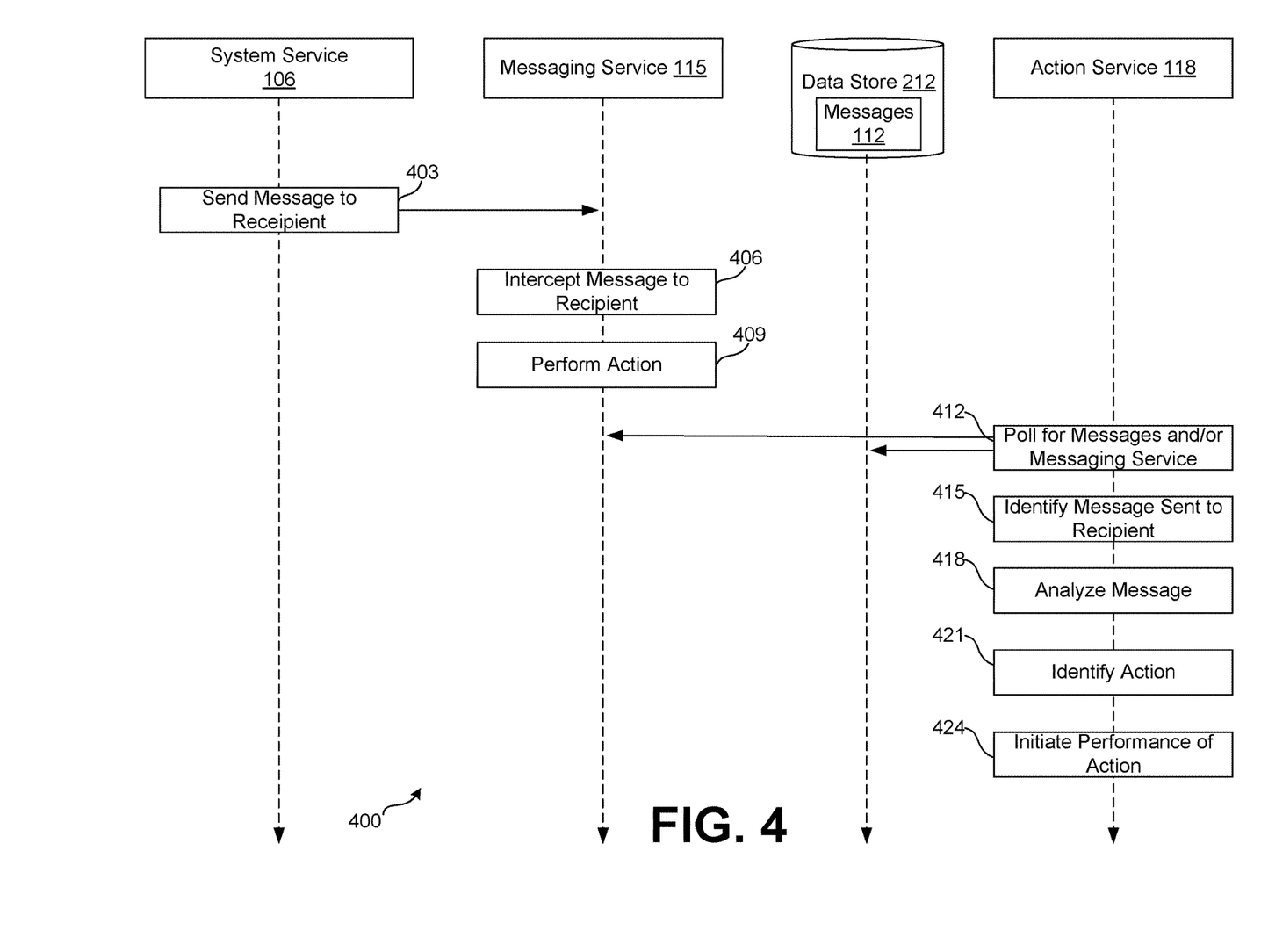

Referring next to FIG. 4, shown is a sequence diagram 400 illustrating functionality implemented by components of the networked environment 200. It is understood that the sequence diagram of FIG. 4 provides merely an example of the many different types of functional arrangements that can be employed to implement the portions of the networked environment 200 as described herein. As an alternative, the sequence diagram of FIG. 4 can be viewed as depicting an example of elements of a method implemented within the networked environment 200 in some implementations. According to various examples, FIG. 4 relates to the functionality implemented by components of the networked environment 200 with respect to the example scenario 100b of FIG. 1B where a system service 106 of a multi-service system 109 generates a message 112 with respect to a metric deviation and the action service 118 analyzes the message 112 generated by the system service 106 to determine an action 121 to be performed.

To begin, at box 403, a system service 106 sends a message 112 to a recipient associated with a given domain and/or domain alias. In various examples, the message 112 includes message content indicating a current and/or scheduled deviation associated with a given metric. For example, the message 112 may indicated that the system service 106 is currently experiencing an outage or the system service 106 is planning to experience an outage at a predefined future date and/or time.

At box 406, the messaging service 115 intercepts the message 112 being routed from the email server to the recipient. For example, the messaging service 115 monitors the incoming messages 112 for one or more domains and if a message 112 is detected that is associated with the one or more domains, the message 112 is intercepted by the messaging service 115.

At box 409, the messaging service 115 performs an action in response to intercepting the message 112. In some examples, the messaging service 115 stores the message 112 in a messaging database or other data store 212. In some examples, the messaging service 115 copies the message 112 and stores the copy of the message 112 in the messaging database and allows the original message to be transmitted to the recipient. In other examples, the messaging service 115 stores the message 112 in the messaging database. In some examples, the messaging service 115 generates and/or modifies a messaging log that is stored in the data store 212. In various examples, the message log is generated and/or modified to include the messaging content and recipient data associated with the intercepted message 112. In some examples, the messaging service 112 maintains the message log associated with the identified messages 112.

At box 412, the action service 118 polls the data store 212 (or messaging database) and/or messaging service 112 for messages 112 corresponding to a particular recipient and/or domain and/or a message log identifying messages 112 corresponding to a particular recipient and/or domain. The action service 118 may poll the messaging database and/or messaging service 112 periodically, randomly, or at a predefined schedule. When a message 112 corresponding to the domain and/or recipient is detected in the messaging database and/or from the messaging service 112, the action service 118 identifies the message 112 and at box 415, obtains the message 112, a copy of the message 112 and/or message log from the messaging database or messaging service 112.

At box 418, the action service 118 analyzes the message 112. In one or more examples, the action service 118 parses the message content in view of the action rules 227 to identify terms and/or phrases in the message content that can be used to identify the detected issue and determine the appropriate actions 121 required in response to the detected issue.

At box 421, the action service 118 identifies an action 121 that is to be performed based at least in part on the detected issue. For example, the action service 118 compares the detected terms and/or phrases with the action keywords 220 associated with the detected issue and the service 106 experiencing the issue. In one or more examples, the action keywords 220 are mapped to different actions 121 that are to be performed. If there is a match between a term and one or more of the action keywords 220, the identified action 121 is the action 121 associated with the matching action keywords 220.

At box 424, the action service 118 initiates the performance of the identified action 121. For example, the action service 118 may send an action request to one or more components of the multi-service system 109 and/or services 106 included in the multi-service system 109 identifying the action 121 that needs to be performed based at least in part on the identified action 121. Thereafter, this portion of the process proceeds to completion.

Figure 5:
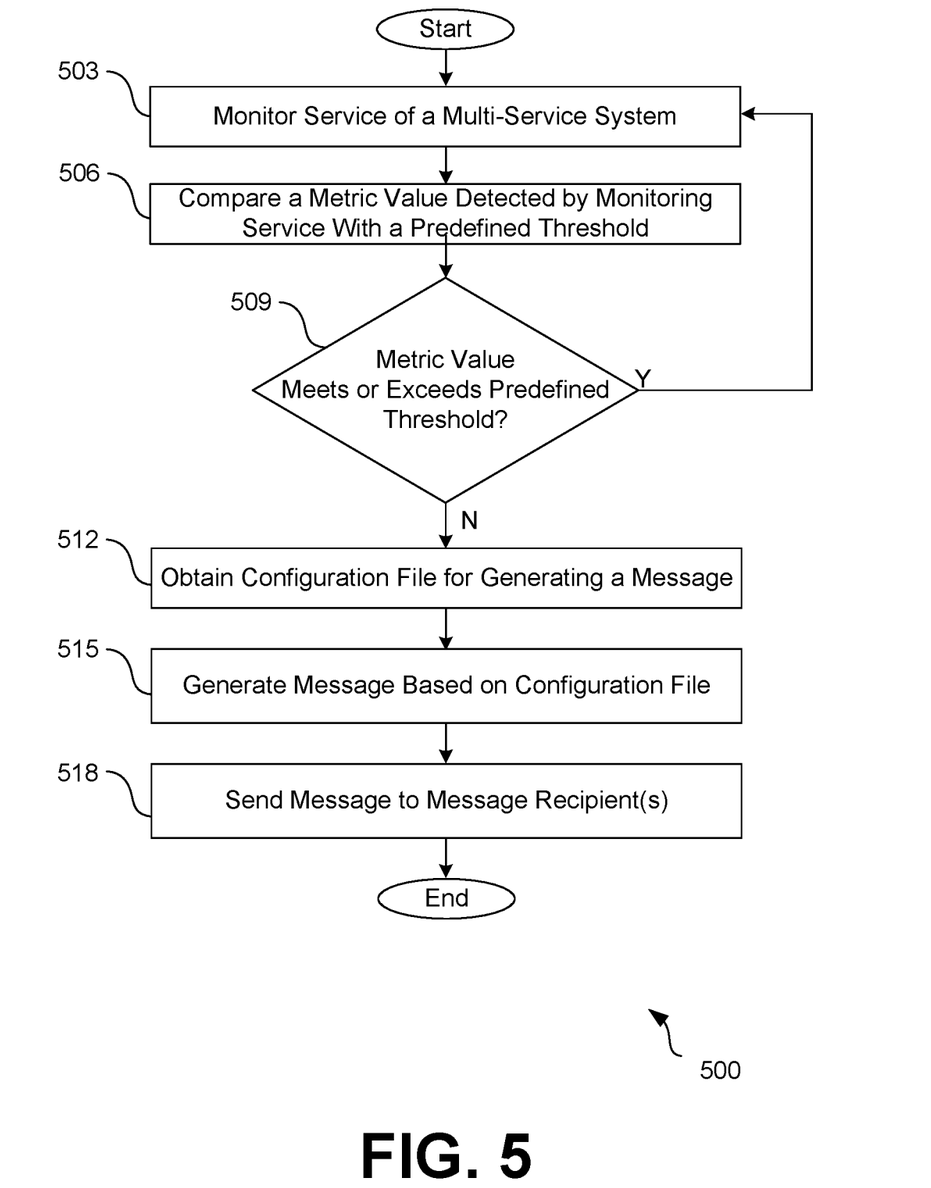
FIG. 5 is a flowchart illustrating one example of functionality implemented as portions of a monitoring service executed in a computing environment in the networked environment of FIG. 2 according to various embodiments of the present disclosure.

Referring next to FIG. 5, shown is a flowchart 500 that provides one example of the operation of a portion of the monitoring service 103 according to various embodiments. It is understood that the flowchart 500 of FIG. 5 provides merely an example of the many different types of functional arrangements that may be employed to implement the operation of the portion of the monitoring service 103 as described herein. As an alternative, the flowchart 500 of FIG. 5 may be viewed as depicting an example of elements of a method implemented in the computing environment 203 (FIG. 2) according to one or more embodiments.

Beginning with box 503, the monitoring service 103 monitors one or more services 106 of a multi-service system. In various examples, the monitoring service 103 sends requests for metric data 110 to the one or more services 106 and in response receives metric data 110 from the one or more services 106. The metric data 110 comprises health data and/or business data associated with the service 106. In some examples, the one or more services 106 sends metric data 110 to the monitoring service 103 without being requested by the monitoring service 103.

At box 506, the monitoring service 103 compares a metric value of a metric included in the metric data 110 with a predefined service threshold 218. In one or more examples, a service threshold 218 corresponds to a minimum of an expected value for the given metric.

At box 509, the monitoring service 103 determines if the metric value meets or exceeds the predefined service threshold 218 based at least in part on the comparison. If the metric value meets or exceeds the predefined service threshold 218, the monitoring service 103 returns to box 503. Otherwise, the monitoring service 103 proceeds to box 512.

At box 512, the monitoring service 103 obtains the configuration file 215 for generating a message 112 based at least in part on the service 106 and the given metric. For example, there may be multiple configuration files 215 for the service 106 that differ based at least in part on the type of deviation that is determined according to the analysis of the metric value.

At box 515, the monitoring service 103 generates a message 112 according to the configuration file 215 associated with the corresponding system service 106. The configuration file 215 defines the content to include in a dynamically generated message 112. For example, the message 112 can comprise an identification of the metric deviation (e.g., outage, latency issue, etc.) the expected metric value, the actual metric value, a time in which the deviation was detected, a timeline for how long the deviation has occurred, one or more predefined keywords or status descriptions that can be used to trigger a given action, and/or other information defined by the configuration file 215. In various examples, the recipient address(es) for the recipient(s) of the message 112 is defined by the configuration file 215.

At step 518, the monitoring service 103 sends the message 112 to the recipient address associated with the message 112 and defined by the configuration file 215. In various examples, the message 112 is sent as a push-based notification to the recipient address. As can be appreciated, the message 112 is transferred from the monitoring service 103 to an email server which in turn routes the message 112 to the appropriate recipient address based at least in part on the domain associated with the message 112. Thereafter, this portion of the process proceeds to completion.

Figure 6:
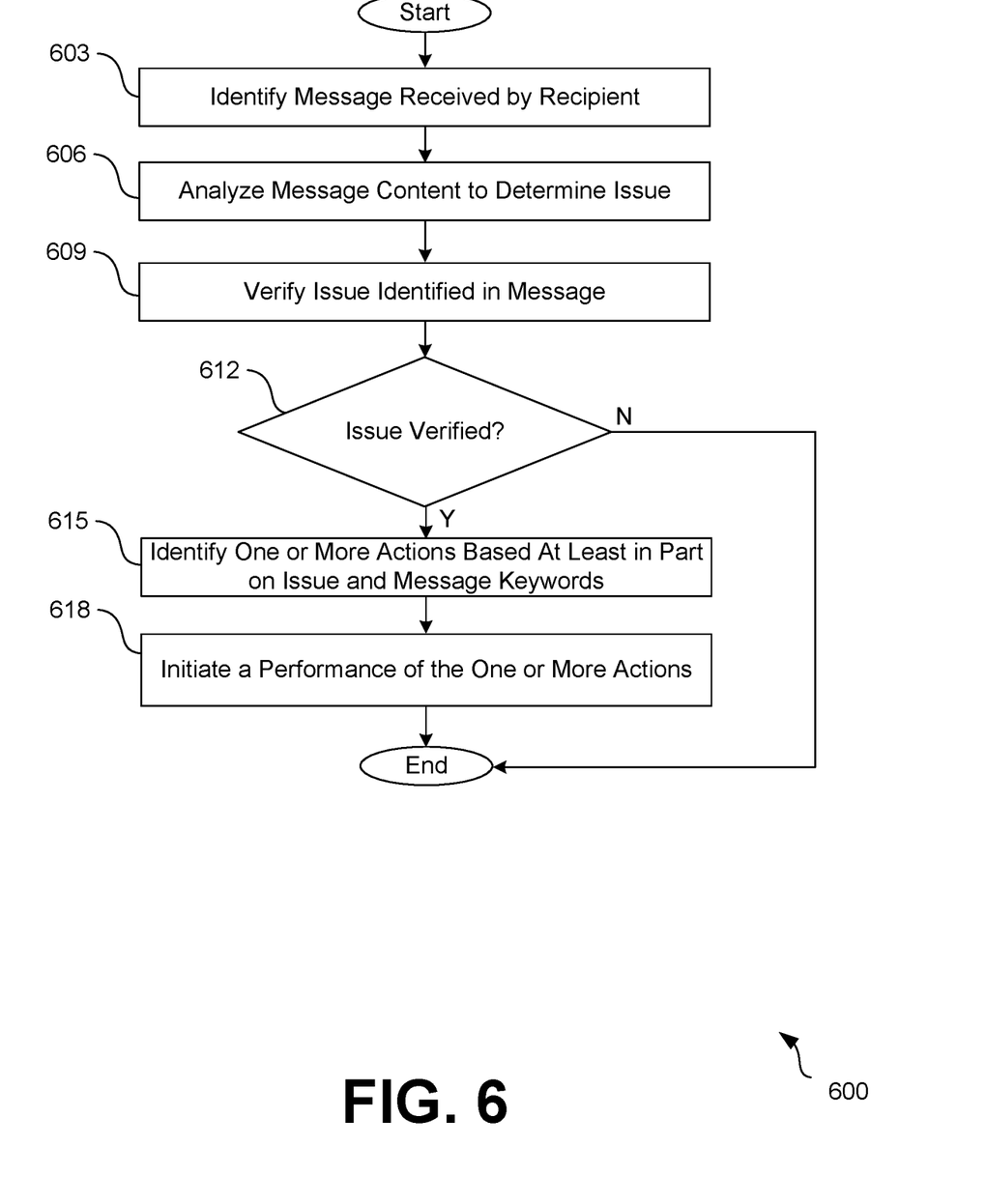
FIG. 6 is a flowchart illustrating one example of functionality implemented as portions of an action service executed in a computing environment in the networked environment of FIG. 2 according to various embodiments of the present disclosure.

Referring next to FIG. 6, shown is a flowchart 600 that provides one example of the operation of a portion of the action service 118 according to various embodiments. It is understood that the flowchart 600 of FIG. 6 provides merely an example of the many different types of functional arrangements that may be employed to implement the operation of the portion of the monitoring service 103 as described herein. As an alternative, the flowchart 600 of FIG. 6 may be viewed as depicting an example of elements of a method implemented in the computing environment 203 (FIG. 2) according to one or more embodiments.

Beginning with box 603, the action service 118 identifies a message 112 sent to a given recipient and/or domain. In one or more examples, the action service 118 polls the messaging database for messages 112 corresponding to a particular recipient and/or domain. The action service 118 may poll the messaging database periodically, randomly, or at a predefined schedule. When a message 112 corresponding to the domain and/or recipient is detected in the messaging database, the action service 118 identifies the message 112 and obtains the message 112 and/or copy of the message 112 from the messaging database.

At box 606, the action service 118 analyzes the message content to identify the issue. For example, the action service 118 may parse the message content into a plurality of terms and/or phrases and compare the terms and/or phrases with action keywords 220 to identify a given issue. In other examples, the action service 118 may apply the terms and/or phrases to one or more models defined in the action rules 227 which are trained to identify an issue according to the identified terms and/or phrases included in the message content. In some examples, the message 112 is generated to include content that indicates the issue and the action service 118 can identify the issue according to the structure of the message content.

At box 609, the action service 118 verifies the issue identified in the message 112. In one or more examples, the action service 118 may send a request to the service 106 indicating the issue and requesting for confirmation that the issue is occurring. In other examples, the action service 118 may request for metric data 110 from the service 106 and verify that the issue is occurring according to an analysis of the metric data 110 received from the service 106.

At box 612, the action service 118 determines whether the issue is verified. If the action service 118 determines that the issue is not occurring, the action service 118 proceeds to completion. Otherwise, the action service 118 proceeds to box 615.

At box 615, the action service 118 identifies an action 121 that is to be performed based at least in part on the detected issue and the terms and/or phrases identified from the parsed message content. For example, the action service 118 compares the parsed terms and/or phrases with the action keywords 220 associated with the detected issue and the service 106 experiencing the issue. In one or more examples, the action keywords 220 are mapped to different actions 121 that are to be performed. If there is a match between a term and one or more of the action keywords, the identified action 121 is the action 121 associated with the matching action keywords 220.

At box 618, the action service 118 initiates the performance of the identified action 121. For example, the action service 118 may send an action request to one or more components of the multi-service system 109 and/or services 106 included in the multi-service system 109 identifying the action 121 that needs to be performed based at least in part on the identified action 121. Thereafter, this portion of the process proceeds to completion.

Figure 7:
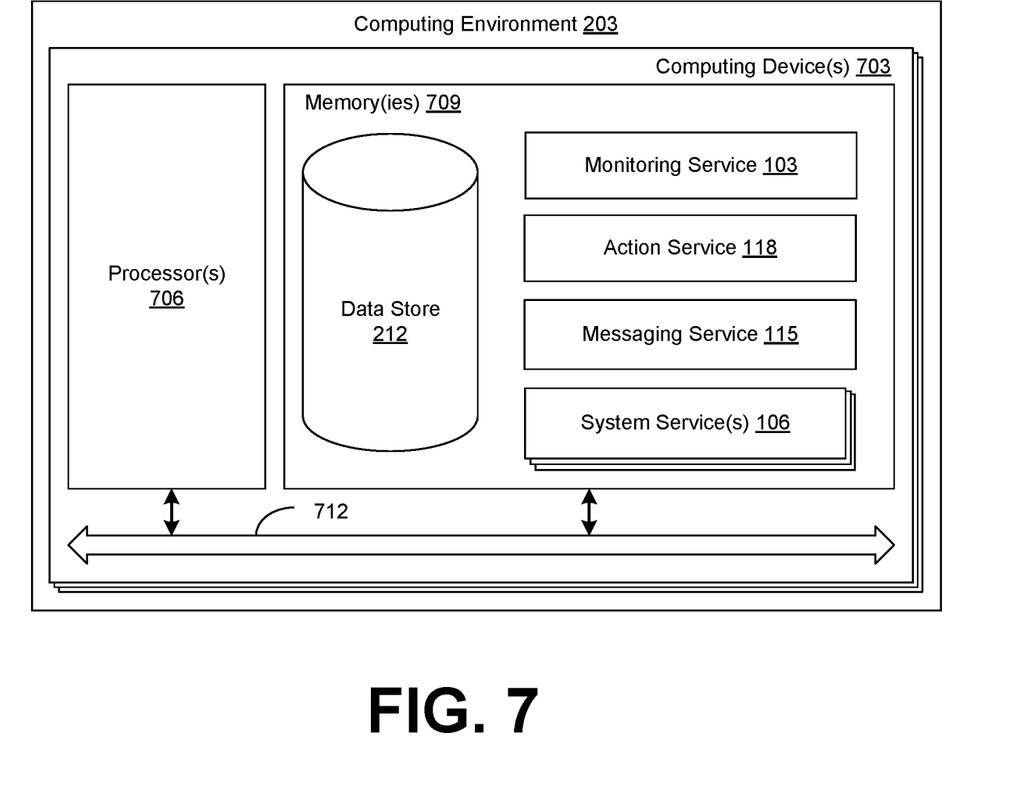
FIG. 7 is a schematic block diagram that provides one example illustration of a computing environment employed in the networked environment of FIG. 2 according to various embodiments of the present disclosure.

With reference to FIG. 7, shown is a schematic block diagram of the computing environment 203 according to an embodiment of the present disclosure. The computing environment 203 includes one or more computing devices 703. Each computing device 703 includes at least one processor circuit, for example, having a processor 706 and a memory 709, both of which are coupled to a local interface 712. To this end, each computing device 703 may comprise, for example, at least one server computer or like device. The local interface 712 may comprise, for example, a data bus with an accompanying address/control bus or other bus structure as can be appreciated.

Stored in the memory 709 are both data and several components that are executable by the processor 706. In particular, stored in the memory 709 and executable by the processor 706 are a monitoring service 103, an action service 118, a messaging service 115, system services 106, and potentially other applications. Also stored in the memory 709 may be a data store 212 and other data. In addition, an operating system may be stored in the memory 709 and executable by the processor 706.

It is understood that there may be other applications that are stored in the memory 709 and are executable by the processor 706 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 709 and are executable by the processor 706. In this respect, the term "executable" means a program file that is in a form that can ultimately be run by the processor 706. Examples of executable programs may be, for example, a compiled program that can be translated into machine code in a format that can be loaded into a random access portion of the memory 709 and run by the processor 706, source code that may be expressed in proper format such as object code that is capable of being loaded into a random access portion of the memory 709 and executed by the processor 706, or source code that may be interpreted by another executable program to generate instructions in a random access portion of the memory 709 to be executed by the processor 706, etc. An executable program may be stored in any portion or component of the memory 709 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 709 is defined herein as including both volatile and nonvolatile memory and data storage components. Volatile components are those that do not retain data values upon loss of power. Nonvolatile components are those that retain data upon a loss of power. Thus, the memory 709 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 706 may represent multiple processors 706 and/or multiple processor cores and the memory 709 may represent multiple memories 709 that operate in parallel processing circuits, respectively. In such a case, the local interface 712 may be an appropriate network that facilitates communication between any two of the multiple processors 706, between any processor 706 and any of the memories 709, or between any two of the memories 709, etc. The local interface 712 may comprise additional systems designed to coordinate this communication, including, for example, performing load balancing. The processor 706 may be of electrical or of some other available construction.

Although the monitoring service 103, the action service 118, the messaging service 115, the system services 106, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The sequence diagrams of FIGS. 3 and 4 and the flowcharts of FIGS. 5 and 6 show the functionality and operation of an implementation of portions of the monitoring service 103, the action service 118, the messaging service 115, and the system services 106. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 706 in a computer system or other system. The machine code may be converted from the source code, etc. If embodied in hardware, each block may represent a circuit or a number of interconnected circuits to implement the specified logical function(s).

Although the sequence diagrams of FIGS. 3 and 4 and the flowcharts of FIGS. 5 and 6 show a specific order of execution, it is understood that the order of execution may differ from that which is depicted. For example, the order of execution of two or more blocks may be scrambled relative to the order shown. Also, two or more blocks shown in succession in FIGS. 3-6 may be executed concurrently or with partial concurrence. Further, in some embodiments, one or more of the blocks shown in FIGS. 3-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the monitoring service 103, the action service 118, the messaging service 115, and the system services 106, that comprises software or code can be embodied in any non-transitory computer-readable medium for use by or in connection with an instruction execution system such as, for example, a processor 706 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the monitoring service 103, the action service 118, the messaging service 115, and the system services 106, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 703, or in multiple computing devices 703 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
one or more computing devices;
a monitoring service executable by at least one of the one or more computing devices, wherein, when executed, the monitoring service causes the at least one of the one or more computing devices to at least:
monitor a metric associated with a system service of a multi-service system, the metric comprising a health metric or a business metric;
detect an issue with the system service based at least in part on a metric value of the metric failing to meet or exceed a predefined metric value;
select a configuration file from a plurality of configuration files based at least in part on the system service and the issue, individual configuration files corresponding to a respective system service of a plurality of system services of the multi-service system, the configuration file defining a recipient address based at least in part on the issue;
generate a push-based notification email identifying the issue, a selected push-based notification email being generated according to the configuration file that is selected based at least in part on the system service and a type of issue, and message content of the push-based notification email being defined according to the configuration file; and
transmit the push-based notification email to the recipient address; and
an action service executable by at least one of the one or more computing devices, wherein, when executed, the action service causes the at least one of the one or more computing devices to at least:
obtain the push-based notification email from a message database, the push-based notification email being stored in the message database according to a domain associated with the recipient address in response to the push-based notification email being received by transmitted to the recipient address;
identify an action to be performed based at least in part on a comparison of one or more message terms extracted from the message content with a list of action keywords associated with a recipient and the system service; and
initiate a performance of the action.

2. The system of claim 1, wherein the action comprises at least one of updating a database, executing code to perform a compute action associated with a detected issue, executing code to modify a user interface, executing a query action, updating a configuration action, or notifying one or more other entities of the detected issue.

3. The system of claim 1, wherein the metric comprises a latency metric, an outage metric, an error metric, a saturation metric, or a load and demand metric, a business performance, a customer interaction metric, an approval metric, or a rejection metric.

4. A method, comprising:
polling, by at least one computing device, a message database comprising a plurality of messages to identify a message based at least in part on a message domain corresponding to a domain associated with a recipient address of the message defined in a configuration file, the message being stored in the message database upon being received by an entity, and the message being obtained from the message database;

obtaining, by the at least one computing device, the message received by the entity from the message database, the message being stored in the message database according to the domain associated with the recipient address, the message indicating a detected issue with a service in a multi-service system, the message being generated according to the configuration file selected by a monitoring service monitoring one or more metrics of the service;

analyzing, by the at least one computing device, message content of the message to identify one or more message terms;

identifying, by the at least one computing device, at least one action to be performed based at least in part on a comparison of the one or more message terms with a list of action keywords associated with the entity; and initiating, by the at least one computing device, a performance of the at least one action by one or more components of the multi-service system.

5. The method of claim 4, wherein the at least one action comprises at least one of updating a database, executing code to perform a compute action associated with the detected issue, executing code to modify a user interface, executing a query action, updating a configuration action, or notifying one or more other entities of the detected issue.

6. The method of claim 4, wherein the recipient address associated with the message corresponds to a domain alias for a domain of the entity.

7. The method of claim 4, wherein the one or more metrics comprise at least one of a health metric or a business metric.

8. The method of claim 4, wherein the one or more metrics comprises a latency metric, an outage metric, an error metric, a saturation metric, a load and demand metric, a business performance metric, a customer interaction metric, an approval metric, or a rejection metric.

9. The method of claim 4, wherein analyzing the message content comprises parsing the message content into the one or more message terms.

10. The method of claim 4, wherein a plurality of services of the multi-service system, a subset of the plurality of services corresponding to third-party services.

11. The method of claim 4, further comprising transmitting the message to the recipient address.

12. A non-transitory, computer-readable medium comprising machine-readable instructions that, when executed by a processor of a computing device to at least:

poll, by at least one computing device, a message database comprising a plurality of messages to identify a message based at least in part on a message domain corresponding to a domain associated with a recipient address of the message defined in a configuration file, the message being stored in the message database upon being received by an entity, and the message being obtained from the message database;

obtain, by the at least one computing device, the message received by the entity from the message database, the message being stored in the message database according to the domain associated with the recipient address, the message indicating a detected issue with a service in a multi-service system, the message being generated according to the configuration file selected by a monitoring service monitoring one or more metrics of the service;

analyze, by the at least one computing device, message content of the message to identify one or more message terms;

identify, by the at least one computing device, at least one action to be performed based at least in part on a comparison of the one or more message terms with a list of action keywords associated with the entity; and initiate, by the at least one computing device, a performance of the at least one action by one or more components of the multi-service system.

13. The non-transitory, computer-readable medium of claim 12, wherein the at least one action comprises at least one of updating a database, executing code to perform a compute action associated with the detected issue, executing code to modify a user interface, executing a query action, updating a configuration action, or notifying one or more other entities of the detected issue.

14. The non-transitory, computer-readable medium of claim 12, wherein the recipient address associated with the message corresponds to a domain alias for domain of the entity.

15. The non-transitory, computer-readable medium of claim 12, wherein the one or more metrics comprise at least one of a health metric or a business metric.

16. The non-transitory, computer-readable medium of claim 12, wherein the one or more metrics comprises a latency metric, an outage metric, an error metric, a saturation metric, a load and demand metric, a business performance metric, a customer interaction metric, an approval metric, or a rejection metric.

17. The non-transitory, computer-readable medium of claim 12, wherein analyzing the message content comprises parsing the message content into the one or more message terms.

18. The non-transitory, computer-readable medium of claim 12, wherein a plurality of services of the multi-service system, a subset of the plurality of services corresponding to third-party services.

19. The non-transitory, computer-readable medium of claim 12, wherein, when executed, the machine-readable instructions further cause the computing device to at least transmit the message to the recipient address.

20. The non-transitory, computer-readable medium of claim 19, wherein the recipient address comprises a domain alias associated with a recipient.

* * * * *